(12) United States Patent
Burgmair et al.

(10) Patent No.: US 11,035,309 B2
(45) Date of Patent: *Jun. 15, 2021

(54) INTERNAL COMBUSTION ENGINE WITH INJECTION QUANTITY CONTROL

(71) Applicant: INNIO Jenbacher GmbH & Co OG, Tirol (AT)

(72) Inventors: Raphael Burgmair, Feldkirchen-Westerham (DE); Medy Satria, Munich (DE); Dino Imhof, Munich (DE)

(73) Assignee: INNIO Jenbacher GmbH & Co OG, Jenback (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/772,660

(22) PCT Filed: Nov. 3, 2016

(86) PCT No.: PCT/AT2016/060099
§ 371 (c)(1),
(2) Date: Aug. 28, 2018

(87) PCT Pub. No.: WO2017/075642
PCT Pub. Date: May 11, 2017

(65) Prior Publication Data
US 2018/0363581 A1 Dec. 20, 2018

(30) Foreign Application Priority Data
Nov. 4, 2015 (EP) .................................. 15192920

(51) Int. Cl.
*F02D 41/14* (2006.01)
*F02D 41/24* (2006.01)
(Continued)

(52) U.S. Cl.
CPC ....... *F02D 41/1402* (2013.01); *F02D 19/061* (2013.01); *F02D 19/0631* (2013.01);
(Continued)

(58) Field of Classification Search
CPC .... F02D 19/06; F02D 19/061; F02D 19/0631; F02D 19/0642; F02D 41/00;
(Continued)

(56) References Cited

U.S. PATENT DOCUMENTS 6,557,530 B1 * 5/2003 Benson .................... F02D 41/22
123/447
2004/0118557 A1 6/2004 Ancimer et al.
(Continued)

FOREIGN PATENT DOCUMENTS

DE 10 2012 109655 A1 4/2014
WO 2011/072293 A2 6/2011

OTHER PUBLICATIONS

Extended European Search Report and Opinion issued in connection with corresponding EP Application No. 15192920.5 dated Jun. 27, 2016.
(Continued)

*Primary Examiner* — Hung Q Nguyen
*Assistant Examiner* — Johnny H Hoang
(74) *Attorney, Agent, or Firm* — Fletcher Yoder, P.C.

(57) ABSTRACT

An internal combustion engine is provided. The internal combustion engine includes a control device, and at least one injector for liquid fuel. The injector(s) can be controlled by the control device via an actuator control signal. The injector(s) include an injector outlet opening for the liquid fuel which can be closed by a needle. A sensor is also provided for measuring a measurement variable of the injector(s). The sensor is or can be in a signal connection with the control device. An algorithm is stored in the control
(Continued)

device, which algorithm calculates a state of the injector(s) based on input variables and an injector model, compares the state calculated via the injector model with a target state, and produces a state signal in accordance therewith. The state signal is characteristic of a change in the state of the injector(s) that occurs during intended use of the injector(s) and/or an unforeseen change in the state of the injector(s). The input variables include at least the actuator control signal and the measurement values of the sensor. A method for operating such an internal combustion engine and an injector is also provided.

20 Claims, 2 Drawing Sheets

(51) Int. Cl.
| | |
|---|---|
| *F02D 41/00* | (2006.01) |
| *F02D 19/06* | (2006.01) |
| *F02M 43/04* | (2006.01) |
| *F02D 41/20* | (2006.01) |
| *F02D 19/10* | (2006.01) |
| *F02D 41/38* | (2006.01) |
| *F02M 61/10* | (2006.01) |
| *F02D 41/30* | (2006.01) |

(52) U.S. Cl.
CPC ....... *F02D 19/0642* (2013.01); *F02D 19/105* (2013.01); *F02D 41/0027* (2013.01); *F02D 41/1401* (2013.01); *F02D 41/20* (2013.01); *F02D 41/247* (2013.01); *F02D 41/3827* (2013.01); *F02M 43/04* (2013.01); *F02M 61/10* (2013.01); *F02D 41/0025* (2013.01); *F02D 41/3047* (2013.01); *F02D 2041/143* (2013.01); *F02D 2041/1416* (2013.01); *F02D 2041/1434* (2013.01); *F02D 2200/0602* (2013.01); *F02D 2200/063* (2013.01); *F02D 2200/0611* (2013.01); *F02D 2200/0614* (2013.01); *F02D 2200/0616* (2013.01); *Y02T 10/30* (2013.01)

(58) Field of Classification Search
CPC .. F02D 41/0027; F02D 41/14; F02D 41/1402; F02D 41/38; F02D 41/3827; F02D 2200/0602; F02D 2200/0614; F02D 2200/063; F02M 43/04; F02M 61/10
USPC ..... 123/299, 1 A, 27 GE, 525–527, 575–577
See application file for complete search history.

(56) References Cited

U.S. PATENT DOCUMENTS

| | | | |
|---|---|---|---|
| 2005/0274360 A1 | 12/2005 | Mumford et al. | |
| 2007/0017485 A1* | 1/2007 | Nakane | F02D 41/3845 123/457 |
| 2013/0098333 A1* | 4/2013 | Kim | F02M 43/04 123/445 |
| 2013/0112172 A1* | 5/2013 | Toyohara | F02D 41/345 123/478 |
| 2014/0109873 A1* | 4/2014 | Allezy | F02D 41/403 123/435 |
| 2015/0136072 A1* | 5/2015 | Kim | F02D 19/0684 123/299 |
| 2015/0198083 A1* | 7/2015 | Bandyopadhyay | F02D 13/0203 123/304 |
| 2015/0354492 A1* | 12/2015 | Surnilla | F02D 41/0025 123/349 |
| 2016/0169133 A1* | 6/2016 | Yeager | F02D 41/0027 123/435 |
| 2017/0074201 A1* | 3/2017 | Sujan | F02M 43/00 |
| 2017/0175667 A1* | 6/2017 | Zhang | F02D 41/38 |
| 2017/0356391 A1* | 12/2017 | Singh | F02M 43/04 |

OTHER PUBLICATIONS

International Search Report and Written Opinion issued in connection with corresponding PCT Application No. PCT/AT2016/060099 dated Feb. 9, 2017.

\* cited by examiner

INTERNAL COMBUSTION ENGINE WITH INJECTION QUANTITY CONTROL

FIELD OF TECHNOLOGY

This disclosure relates to an internal combustion engine with the features of the preamble of claim 1 and a method with the features of the preamble of claim 14 or 15.

BACKGROUND

A class-specific internal combustion engine and a class-specific method are derived from DE 100 55 192 A1. This publication discloses a method for concentricity control of diesel engines, wherein the injection quantity of the injectors assigned to the cylinders is corrected by means of a correction factor.

The problem is that the injectors known from the prior art are replaced after a certain service life (number of operating hours) without knowing whether the replacement is even necessary based on the internal state of the injector.

SUMMARY

The object of the disclosure is to provide an internal combustion engine and a method in which only those injectors need to be replaced where this is necessary due to their internal condition.

This object is achieved by an internal combustion engine with the features of claim 1 and a method with the features of claim 14 or 15. Advantageous embodiments of the disclosure are defined in the dependent claims.

An example of the liquid fuel is diesel. It could also be heavy oil or another self-igniting fuel.

The disclosure provides that an algorithm is stored in the control device, which algorithm calculates a state of the injector on the basis of input variables and an injector model, compares the state calculated by means of the injector model with a target state, and produces a state signal in accordance therewith, which state signal is characteristic of a change in the state of the injector that occurs during intended use of the injector (e.g. due to aging and/or wear and tear) and/or an unforeseen change in the state of the injector (e.g. due to damage to the injector or excessive formation of deposits), wherein the input variables comprise at least the actuator control signal and the measurement values of the sensor.

The control device compares a value at the time of execution of the algorithm (specified normal value or value from one or more of the last combustion cycles) for at least one variable contained in the injector model (e.g. pressure progression in one of the volumes or mass flows between adjacent volumes or the kinematics of the needle during an injection process) with the current estimated value determined by the algorithm. The state of the injector can be deduced in case of any change. On the basis of the conclusion, the control device can produce the signal representative of the state of the injector.

If, for example, with constant duration of actuation of the actuator the estimated kinematics of the needle changes so that the needle lifts off the needle seat slower or faster, the control device interprets this in such a way that the state of the injector has changed. This can be due to wear and tear, aging or damage to the injector and the control device can (e.g. on the basis of empirical values) determine the remaining service life of the injector. If the deviation is greater than a specified target value, the control device can indicate when or that the injector is to be replaced based on the state signal.

It is in an embodiment provided that the algorithm comprises a pilot control which calculates a pilot control signal for the actuator control signal from a desired target value of the amount of liquid fuel and/or a needle position target value. The pilot control ensures a fast system response, because in case of necessary corrections of the actuator control signal or the pilot control signal, it controls the actuator as if no injector variability would exist.

The pilot control uses, for example, an injector map (which, for example, in the case of an actuator designed as a solenoid valve, indicates the duration of current flow over the injection amount or volume) or an inverted injector model to convert the target value of the amount of liquid fuel to be injected and/or the needle position target value into the pilot control command.

When the control device is designed with pilot control, it can be particularly in an embodiment provided that the algorithm comprises a feedback loop, which, taking into account the actuator control signal calculated by the pilot control and the at least one measurement variable by means of the injector model, calculates the amount of liquid fuel discharged via the discharge opening of the injector and/or the position of the needle and, if necessary, (if there is a deviation) corrects the pilot control signal calculated by the pilot control for the actuator control signal. The feedback loop is used to correct the inaccuracies of the pilot control (due to manufacturing variabilities, wear, etc.), which cause an injector drift.

The algorithm has in an embodiment an observer which, using the injector model, estimates the injected amount of liquid fuel and/or the position of the needle depending on the at least one measurement variable and the at least one actuator control signal. An actual measurement of the injected amount of liquid fuel or the measurement of the position of the needle is therefore not required for the feedback loop. Regardless of whether a feedback loop is provided, the injected amount of liquid fuel estimated by the observer and/or the estimated position of the needle in the pilot control can be used to improve the actuator control signal.

Various possible formations of the observer are known to the person skilled in the art from the literature (e.g. Luenberger observer, Kalman filter, "sliding mode" observer, etc.).

In principle, it is possible to calculate the actuator control signal on the basis of the target value for the injected amount of liquid fuel and/or the position of the needle and on the basis of the amount of liquid fuel estimated by the observer or the estimated position of the needle. This gives an adaptive pilot control signal modified by the observer. In this case, the control is therefore not constructed in two parts, with a pilot control and a feedback loop correcting the pilot control signal.

It may be provided that the injector model comprises at least:
  the pressure progressions in the volumes of the injector filled with the liquid fuel
  mass flow rates between the volumes of the injector filled with the liquid fuel
  kinematic variables of the needle, e.g. a position of the needle, in an embodiment relative to the needle seat
  dynamics of the actuator of the needle, in an embodiment solenoid valve dynamics The invention makes it possible to monitor selected or all of the above-mentioned variables over time and, if necessary, to react with maintenance or replacement of the injector ("condition based maintenance").

The injector may comprise at least:
- an input storage chamber connected to a common rail of the internal combustion engine
- a storage chamber for liquid fuel connected to said input storage chamber
- a volume connected to the storage chamber via needle seat
- a connection volume connected on one side to the storage chamber and on the other side to a drain line
- a discharge opening for liquid fuel, which can be closed by a needle and is connected to the volume via a needle seat
- an actuator controllable by means of the actuator control signal, in an embodiment a solenoid valve, for opening the needle
- in an embodiment a control chamber connected on one side to the storage chamber and on the other side to the connection volume The needle is usually preloaded by a spring against the opening direction.

An injector can be provided, which does not require a control chamber, e.g. an injector in which the needle is controlled by a piezo element.

The at least one measurement variable can be, for example, selected from the following variables or a combination thereof:
- pressure in a common rail of the internal combustion engine
- pressure in an input storage chamber of the injector
- pressure in a control chamber of the injector
- start of needle lift-off from the needle seat.

The control device may be designed to execute the algorithm during each combustion cycle or selected combustion cycles of the internal combustion engine.

Alternatively, the control device may be designed to execute the algorithm during each combustion cycle or selected combustion cycles of the internal combustion engine.

Alternatively, or in addition to one of the above-mentioned embodiments, the control device may be designed to execute the algorithm during each combustion cycle or selected combustion cycles of the internal combustion engine and to statically evaluate the deviations that have occurred.

It is not absolutely necessary for the invention to measure the amount of injected liquid fuel or the position of the needle directly. It is also not necessary to deduce directly from the at least one measurement variable the actual injected amount of liquid fuel or the position of the needle.

In general, the following applies: Instead of the amount of injected fuel, it is of course also possible to calculate the volume or other variables which are characteristic of a certain amount of injected fuel. All these possibilities are covered in this disclosure when using the term "amount".

The invention can in an embodiment be used in a stationary internal combustion engine, for marine applications or mobile applications such as so-called "non-road mobile machinery" (NRMM), in an embodiment as a reciprocating piston engine. The internal combustion engine can be used as a mechanical drive, e.g. for operating compressor systems or coupled with a generator to a genset for generating electrical energy. The internal combustion engine in an embodiment comprises a plurality of combustion chambers with corresponding gas supply devices and injectors. Each combustion chamber can be controlled individually.

BRIEF DESCRIPTION OF THE DRAWINGS

Exemplary embodiments of the disclosure are explained in more detail by the figures below. They are as follows.

DETAILED DESCRIPTION

Figure 1:
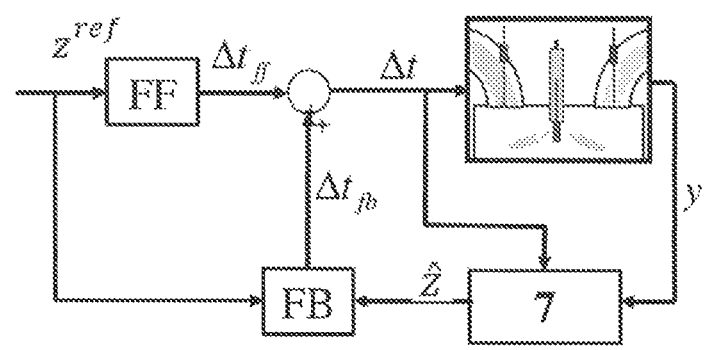
FIG. 1 a first exemplary embodiment of a first control diagram
Figure 2:
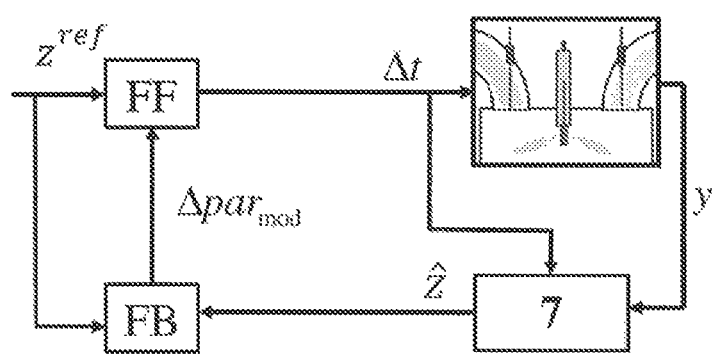
FIG. 2 a second exemplary embodiment of a second control diagram
Figure 3:
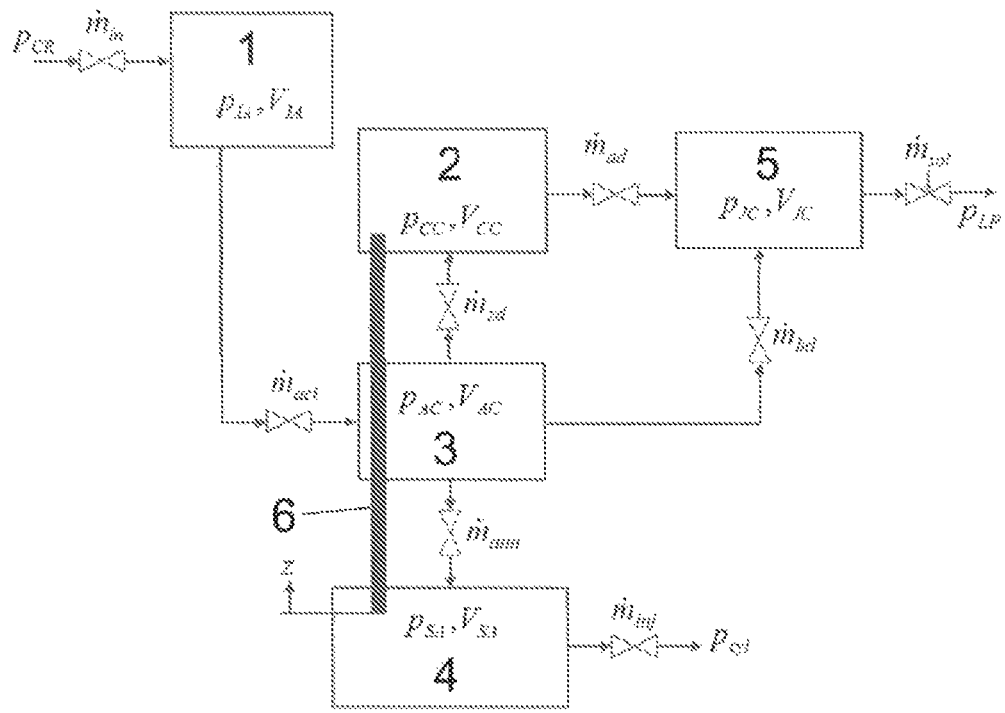
FIG. 3 a first example of a schematic representation of an injector

FIG. 1:

The object of the injector control in this exemplary embodiment is the control of the actual injected amount of liquid fuel and/or the position z of the needle to a target value $m_d^{ref}$ or $z^{ref}$, by controlling the injection duration or the duration of actuation of the actuator of the needle $\Delta t$. The control strategy is carried out by
- a pilot control (FF), which consist of a desired target value of the amount $m_d^{ref}$ on liquid fuel and/or a needle position target value $z^{ref}$ calculates a pilot control signal $\Delta t_{ff}$ (hereinafter also referred to as "control command") for the injection duration or the duration of actuation of the actuator and
- a feedback loop (FB) which, using an observer 7 ("state estimator"), taking into account the pilot control signal $\Delta t_{ff}$ calculated by the pilot control and at least one measurement variable y (e.g. one of the pressure progressions $p_{IA}$, $p_{cc}$, $p_{JC}$, $p_{AC}$, $p_{SA}$ occurring in the injector or the start of the needle lift-off from the needle seat), the mass flow $\hat{m}_d$ of liquid fuel discharged via the discharge opening of the injector and/or the position of the needle $\hat{z}$ estimated by means of the injector model and, if necessary, corrects the pilot control signal $\Delta t_{ff}$ calculated by the pilot control by means of a correction value $\Delta t_{fb}$. The observer also outputs the state signal C.

The pilot control ensures a fast system response, since it controls the injector with an injection duration $\Delta t$ as if no injector variability would exist. The pilot control uses a calibrated injector map (which indicates the duration of current flow over the injection amount or volume) or an inverted injector model to convert the target value of the amount $m_d^{ref}$ of liquid fuel and/or the needle position target value $z^{ref}$ into the pilot control command $\Delta t_{ff}$.

The feedback loop (FB) is used to correct the inaccuracies of the pilot control (due to manufacturing variabilities, wear, etc.), which cause an injector drift. The feedback loop compares the target value $m_d^{ref}$ and/or $z^{ref}$ with the estimated injected amount $\hat{m}_d$ of liquid fuel or the estimated position of the needle $\hat{z}$ and gives as feedback a correction control command $\Delta t_{fb}$ (which can also be negative) for the injection duration or the duration of actuation of the actuator, if there is a discrepancy between $m_d^{ref}$ and $\hat{m}_d$ or $z^{ref}$ and $\hat{z}$. The addition of $\Delta t_{ff}$ and $\Delta t_{fb}$ gives the final injection duration $\Delta t$ or the duration of actuation of the actuator.

The observer estimates the injected amount $\hat{m}_d$ of liquid fuel and/or the position of the needle $\hat{z}$ in dependence of the at least one measurement variable y and the final injection duration $\Delta t$ or the duration of actuation of the actuator. The at least one measurement variable can refer to: common rail pressure $p_{CR}$, pressure in the input storage chamber $p_{IA}$, pressure in the control chamber $p_{cc}$ and start of the needle lift-off from the needle seat. The observer uses a reduced injector model to estimate the injected amount $\hat{m}_d$ of liquid fuel or the position of the needle $\hat{z}$.

FIG. 2

This figure shows a one-piece control, in which the actuator control signal Δt is calculated based on the target value $m_d^{ref}$ for the injected amount of liquid fuel and/or the needle position target value $z^{ref}$ and based on the parameter $\Delta par_{mod}$ used in the pilot control model and estimated by the observer. This gives an adaptive pilot control signal modified by the observer. In this case, the control is therefore not constructed in two parts, with a pilot control and a feedback loop correcting the pilot control signal.

FIG. 3 shows a block diagram of a reduced injector model. The injector model consists of a structural model of the injector and an equation system to describe the dynamic behavior of the structural model. The structural model consists of five modeled volumes: input storage chamber 1, storage chamber 3, control chamber 2, volume over needle seat 4 and connection volume 5.

The input storage chamber 1 represents the summary of all volumes between the input choke and the non-return valve. The storage chamber 3 represents the summary of all volumes from the non-return valve to volume 4 above the needle seat. The volume 4 over the needle seat represents the summary of all volumes between the needle seat to the discharge opening of the injector. The connection volume 5 represents the summary of all volumes which connects the storage chamber 3 and the control chamber 2 with the solenoid valve.

Figure 4:
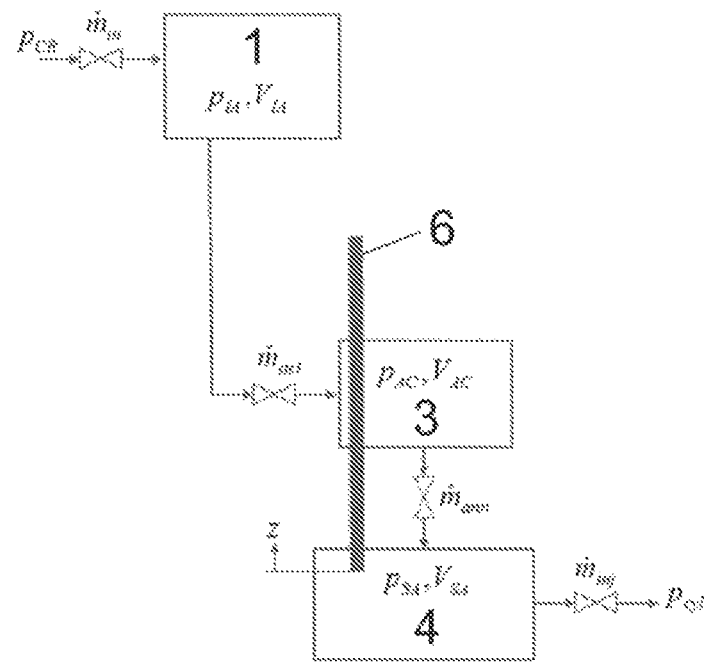
FIG. 4 a second example of a schematic representation of an injector

FIG. 4 shows an alternatively designed injector which does not require control chamber 2, e.g. an injector in which the needle 6 is controlled by a piezo element.

The following equation system is not related to the embodiment shown in FIG. 4. The formulation of a corresponding equation system may be analogous to that shown below.

The dynamic behavior of the structure model is described by the following equation systems:

Pressure Dynamics

The temporal evolution of the pressure within each of the volumes is calculated based on a combination of the mass conservation law and the pressure density characteristic of the liquid fuel. The temporal evolution of the pressure follows from:

$$\dot{p}_{IA} = \frac{K_f}{\rho_{IA} V_{IA}}(\dot{m}_{in} - \dot{m}_{aci}) \quad \text{Eq. 1.1}$$

$$\dot{p}_{CC} = \frac{K_f}{\rho_{CC} V_{CC}}(\dot{m}_{zd} - \dot{m}_{ad} - \rho_{CC}\dot{V}_{CC}) \quad \text{Eq. 1.2}$$

$$\dot{p}_{JC} = \frac{K_f}{\rho_{JC} V_{JC}}(\dot{m}_{bd} + \dot{m}_{ad} + \dot{m}_{sol}) \quad \text{Eq. 1.3}$$

$$\dot{p}_{AC} = \frac{K_f}{\rho_{AC} V_{AC}}(\dot{m}_{aci} - \dot{m}_{ann} - \dot{m}_{bd} - \dot{m}_{zd} - \rho_{AC}\dot{V}_{AC}) \quad \text{Eq. 1.4}$$

$$\dot{p}_{SA} = \frac{K_f}{\rho_{SA} V_{SA}}(\dot{m}_{ann} - \dot{m}_{inj} - \rho_{SA}\dot{V}_{SA}) \quad \text{Eq. 1.5}$$

Formula Symbols Used $p_{IA}$: Pressure in the input storage chamber 1 in bar
$p_{cc}$: Pressure in the control chamber 2 in bar
$p_{JC}$: Pressure in the connection volume 5 in bar
$p_{AC}$: Pressure in the storage chamber 3 in bar
$p_{SA}$: Pressure in the small storage chamber 4 in bar
$p_{IA}$: Diesel mass density within the input storage chamber 1 in kg/m³
$p_{CC}$: Diesel mass density within the control chamber 2 in kg/m³
$p_{JC}$: Diesel mass density within the connection volume 5 in kg/m³
$p_{AC}$: Diesel mass density within the storage chamber 3 in kg/m³
$p_{SA}$: Diesel mass density within the small storage chamber 4 in kg/m³
$K_f$: Bulk modulus of diesel fuel in bar Needle Dynamics The needle position is calculated by the following equation of motion:

$$\ddot{z} = \begin{cases} 0 & \text{if } F_{hyd} \leq F_{pre} \\ \frac{1}{m}(F_{hyd} - Kz - B\dot{z} - F_{pre}) & \text{if } F_{hyd} > F_{pre} \end{cases}$$

$$[F_{hyd} = p_{AC}A_{AC} + p_{SA}A_{SA} - p_{CC}A_{CC}]$$

$$[0 \leq z \leq z_{max}]$$

Formula Symbols Used:

Z: Needle position in meters (m)
$Z_{max}$: Maximum deflection of the needle 6 in m
K: Spring stiffness in N/m
B: Spring damping coefficient in N.s/m
$F_{pre}$: Spring preload in N
$A_{AC}$: Hydraulic effective area in the storage chamber 3 in m²
$A_{SA}$: Hydraulic effective area in the small storage chamber 4 in m²
$A_{CC}$: Hydraulic effective area in the control chamber 2 in m²

Dynamics of the Solenoid Valve

The solenoid valve is modeled by a first order transfer function, which converts the valve opening command in a valve position. This is given by:

$$u_{sol}^{cmd} \rightarrow \boxed{\frac{z_{sol}^{max}}{\tau_{sol}s + 1}} \xrightarrow{z_{sol}}$$

The transient system behavior is characterized by the time constant $\tau_{sol}$ and the position of the needle 6 at the maximum valve opening is given by $z_{sol}^{max}$. Instead of a solenoid valve, a piezoelectric actuation is possible.

Mass Flow Rates

The mass flow rate through each valve is calculated from the standard throttle equation for liquids, which is:

$$\dot{m}_{in} = A_{in}C_{din}\sqrt{2\rho_j|p_{CR} - p_{IA}|} \cdot \text{sgn}(p_{CR} - p_{IA}) \quad \text{Eq. 3.1}$$

$$\dot{m}_{bd} = A_{bd}C_{dbd}\sqrt{2\rho_j|p_{AC} - p_{JC}|} \cdot \text{sgn}(p_{AC} - p_{JC}) \quad \text{Eq. 3.2}$$

$$\dot{m}_{zd} = A_{zd}C_{dzd}\sqrt{2\rho_j|p_{AC} - p_{CC}|} \cdot \text{sgn}(p_{AC} - p_{CC}) \quad \text{Eq. 3.3}$$

$$\dot{m}_{ad} = A_{ad}C_{dad}\sqrt{2\rho_j|p_{CC} - p_{JC}|} \cdot \text{sgn}(p_{CC} - p_{JC}) \quad \text{Eq. 3.4}$$

$$\dot{m}_{sol} = A_{sol}C_{dsol}\sqrt{2\rho_j|p_{JC} - p_{LP}|} \cdot \text{sgn}(p_{JC} - p_{LP}) \quad \text{Eq. 3.5}$$

$$\dot{m}_{aci} = A_{aci}C_{daci}\sqrt{2\rho_j|p_{IA} - p_{AC}|} \cdot \text{sgn}(p_{IA} - p_{AC}) \quad \text{Eq. 3.6}$$

-continued $$\dot{m}_{ann} = A_{ann}C_{dann}\sqrt{2\rho_j|p_{AC} - p_{SA}|} \cdot \text{sgn}(p_{AC} - p_{SA}) \quad \text{Eq. 3.7}$$

$$\dot{m}_{inj} = A_{inj}C_{dinj}\sqrt{2\rho_{SA}|p_{SA} - p_{cyl}|} \cdot \text{sgn}(p_{SA} - p_{cyl}) \quad \text{Eq. 3.8}$$

$$p_j = \begin{cases} p_{in} & \text{if } p_{in} \geq p_{out} \\ p_{out} & \text{if } p_{in} < p_{out} \end{cases} \quad \text{Eq. 3.9}$$

Formula Symbols Used:

$\dot{m}_{in}$: mass flow rate through each input choke in kg/s $\dot{m}_{bd}$: mass flow rate through the bypass valve between storage chamber 3 and the connection volume 5 in kg/s $\dot{m}_{zd}$: mass flow rate through the feed valve at the inlet of the control chamber 2 in kg/s $\dot{m}_{ad}$: mass flow rate through the outlet valve of the control chamber 2 in kg/s $\dot{m}_{sol}$: mass flow rate through the solenoid valve in kg/s $\dot{m}_{aci}$: mass flow rate through the inlet of the storage chamber 3 in kg/s $\dot{m}_{ann}$: mass flow rate through the needle seat in kg/s $\dot{m}_{inj}$: mass flow rate through the injector nozzle in kg/s Based on the above formulated injector model, the person skilled in the art obtains by means of the observer in a known manner (see, for example, Isermann, Rolf, "Digital Control Systems", Springer Verlag Heidelberg 1977, chapter 22.3.2, page 379 et seq., or F. Castillo et al, "Simultaneous Air Fraction and Low-Pressure EGR Mass Flow Rate Estimation for Diesel Engines", IFAC Joint conference SSSC—5th Symposium on System Structure and Control, Grenoble, France 2013) the estimated value $\hat{m}_d$ and/or $\hat{z}$ and the state signal C.

Using the above equation systems, the so-called "observer equations" are constructed, in an embodiment using a known observer of the "sliding mode observer" type, by adding the so-called "observer law" to the equations of the injector model. With a "sliding mode" observer, the observer law is obtained by calculating a "hypersurface" from the at least one measuring signal and the value resulting from the observer equations. By squaring the equation of the hypersurface, a generalized Ljapunov equation (generalized energy equation) is obtained. It is a functional equation. The observer law is that function which minimizes the functional equation. This can be determined by the known variation techniques or numerically. This process is carried out within one combustion cycle for each time step (depending on the time resolution of the control).

The result is depending on the application, the estimated injected amount of liquid fuel, the position of the needle 6 or one of the pressures in one of the volumes of the injector.

What we claim is:

1. An internal combustion engine, comprising:
   a control device;
   at least one injector for liquid fuel, configured to be controlled by the control device via an actuator control signal, wherein the at least one injector comprises an injector outlet opening for the liquid fuel which is closed by a needle; and
   a sensor, by which a measurement variable of the at least one injector can be measured, wherein the sensor is configured to communicate with the control device,
   wherein the control device is configured to:
   calculate a state of the injector on the basis of input variables that comprise at least the actuator control signal and the measurement values of the sensor, and an injector model, compare the state with a target state, produce a state signal, wherein the state signal is representative of a change in the state of the injector that occurs during use of the injector, an unforeseen change in the state of the injector, or a combination thereof, wherein the injector model comprises;
   pressure progressions in the volumes of the injector filled with the liquid fuel;
   mass flow rates between the volumes of the injector filled with the liquid fuel;
   a kinematic variable of the needle being a position of the needle relative to the needle seat; and
   dynamics of the actuator of the needle.

2. The internal combustion engine of claim 1, wherein the control device is configured to provide a pilot control to derive a pilot control signal based on a desired target value of a mass of the liquid fuel, a needle position target value, or a combination thereof, and wherein the pilot control signal is used to control the at least one injector during a pilot mode of operations of the internal combustion engine.

3. The internal combustion engine of claim 2, wherein the control device is configured to provide a feedback loop that uses the pilot control signal calculated by the pilot control and the at least one measurement variable to calculate an output mass of the liquid fuel through an injector outlet opening, the position of the needle, or a combination thereof, and corrects the actuator control signal based on the output mass of the liquid fuel.

4. The internal combustion engine of claim 1, wherein the control device executes an observer, which, using the injector model, the actuator control signal and the at least one measurement variable as inputs, estimates an injected mass of liquid fuel and or the position of the needle to calculate the output mass of the liquid fuel.

5. The internal combustion engine of claim 1, wherein the dynamics of the actuator of the needle comprise solenoid valve dynamics.

6. The internal combustion engine of claim 1, wherein the injector comprises at least:
   an input storage chamber connected to a common rail of the internal combustion engine;
   a storage chamber for liquid fuel connected to the input storage chamber;
   a volume over the needle seat connected to the storage chamber;
   a connection volume connected on one side to the storage chamber and on the other side to a drain line;
   an outlet opening for liquid fuel, which can be closed by a needle and is connected to the volume over the needle seat;
   an actuator controllable by means of the actuator control signal for opening the needle; and
   a control chamber connected on one side to the storage chamber and on the other side to the connection volume.

7. The internal combustion engine of claim 1, wherein the at least one measurement variable is selected from the following variables or a combination thereof:
   pressure in a common rail of the internal combustion engine;
   pressure in an input storage chamber of the injector;
   pressure in a control chamber of the injector; and
   start of the needle lift-off from the needle seat.

8. The internal combustion engine of claim 7, wherein the control device is configured to produce a state signal which provides information about a deviation of at least one of the measurement variables relative to a predetermined value.

9. The internal combustion engine of claim 1, wherein the control device is configured to calculate the state and produce the state signal during each combustion cycle of the internal combustion engine.

10. The internal combustion engine of claim 1, wherein the control device is configured to calculate the state and produce the state signal during selected combustion cycles of the internal combustion engine.

11. The internal combustion engine of claim 1, wherein the control device is configured to calculate the state and produce the state signal during each combustion cycle or selected combustion cycles of the internal combustion engine and to statically evaluate the deviations that have occurred.

12. The internal combustion engine of claim 1, wherein the control device is configured to determine on the basis of the state signal a remaining service life of the injector, whether the injector is to be replaced, or a combination thereof.

13. The internal combustion engine of claim 1, wherein the control device is configured to, based on the state signal, a correction of the actuator control signal, the pilot control signal, or a combination thereof.

14. A method for operating an internal combustion engine, comprising:
   supplying a combustion chamber of the internal combustion engine with liquid fuel;
   sensing at least one measurement variable from an injector for injecting liquid fuel and disposed in the internal combustion engine;
calculating based on input variables and an injector model, a state of the injector; comparing the state of the injector with a target state; and depending on the result; and producing a state signal characteristic of a change in the state of the injector that occurs during an intended use of the injector, an unforeseen change in the state of the injector, or a combination thereof; wherein the input variables comprise at least the actuator control signal and the measurement values of the sensor, wherein the injector model comprises;
   pressure progressions in the volumes of the injector filled with the liquid fuel;
   mass flow rates between the volumes of the injector filled with the liquid fuel;
   a kinematic variable of a needle of the injector comprising a position of the needle relative to a needle seat; and
   dynamics of an actuator of the needle.

15. The method of claim 14, wherein the dynamics of the actuator of the needle comprise solenoid valve dynamics.

16. The method of claim 14, wherein the at least one measurement variable is selected from the following variables or a combination thereof:
   pressure in a common rail of the internal combustion engine;
   pressure in an input storage chamber of the injector;
   pressure in a control chamber of the injector; and
   start of a needle lift-off from a needle seat of the injector.

17. The method of claim 14, wherein producing the state signal comprises producing the state signal during each combustion cycle of the internal combustion engine.

18. The method of claim 14, wherein producing the state signal comprises producing the state signal during selective combustion cycles of the internal combustion engine.

19. A controller of an internal combustion engine, the controller configured to:
   supply a combustion chamber of the internal combustion engine with liquid fuel;
   sense at least one measurement variable from an injector for injecting liquid fuel and disposed in the internal combustion engine;
   calculate based on input variables and an injector model, a state of the injector;
   compare the state of the injector with a target state; and depending on the result;
   and
   produce a state signal characteristic of a change in the state of the injector that occurs during an intended use of the injector, an unforeseen change in the state of the injector, or a combination thereof; wherein the input variables comprise at least the actuator control signal and the measurement values of the sensor, wherein the injector model comprises;
   pressure progressions in the volumes of the injector filled with the liquid fuel;
   mass flow rates between the volumes of the injector filled with the liquid fuel;
   a kinematic variable of a needle of the injector comprising a position of the needle relative to a needle seat; and
   dynamics of an actuator of the needle.

20. The controller of claim 19, wherein the dynamics of the actuator of the needle comprises solenoid valve dynamics.

* * * * *